(12) United States Patent  
Monson et al.

(10) Patent No.: US 6,347,012 B1  
(45) Date of Patent: Feb. 12, 2002

(54) DISPLAY SYSTEM WITH IMPROVED LUMINOSITY

(75) Inventors: Robert James Monson, St. Paul; Michael Edward Smith, St. Bonifacius, both of MN (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/515,236

(22) Filed: Mar. 6, 2000

(51) Int. Cl.[7] .............................. G03B 21/56; G02B 3/08
(52) U.S. Cl. ..................... 359/451; 359/460; 359/743
(58) Field of Search ................ 359/461, 443, 359/460, 457, 743

(56) References Cited

U.S. PATENT DOCUMENTS

| | | | |
|---|---|---|---|
| 3,628,854 A | 12/1971 | Jampoisky | 351/175 |
| 3,982,822 A | 9/1976 | Conder et al. | 350/211 |
| 4,076,384 A | 2/1978 | Demi et al. | 350/122 |
| 4,152,047 A | 5/1979 | Inoue | 350/122 |
| 4,293,196 A | 10/1981 | Hilbert | 350/452 |
| 4,468,092 A | 8/1984 | Inoue et al. | 350/128 |
| 4,482,206 A | 11/1984 | VanBreemen | 350/128 |
| 4,695,135 A | 9/1987 | Den Exter Blokland et al. | 350/452 |
| 4,729,631 A | * 3/1988 | Takahashi et al. | 359/456 |
| 4,730,897 A | 3/1988 | McKechnie | 350/128 |
| 5,064,273 A | 11/1991 | Lee | 359/457 |
| 5,313,326 A | 5/1994 | Ramsbottom | 359/631 |
| 5,390,050 A | 2/1995 | Yanagi et al. | 359/742 |
| 5,402,263 A | * 3/1995 | Kita et al. | 359/451 |
| 5,768,014 A | 6/1998 | Lee | 359/457 |
| 5,864,431 A | 1/1999 | Bordovsky | 359/630 |

* cited by examiner

Primary Examiner—Christopher E. Mahoney  
(74) Attorney, Agent, or Firm—Patrick M. Hogan; Glenn W. Bowen

(57) ABSTRACT

A rear projection system having a display screen and a Fresnel lens wherein each of the incident faces of the viewing segments old the Fresnel lens are angularly positioned so that incoming light rays, which enter each old the viewing segments at different angles, are reflected by each of the segments so that the light rays emerging from each of the viewing segments emerge in a direction parallel to a v viewing axis to thereby limit luminosity differences in images viewable on the display screen.

15 Claims, 2 Drawing Sheets

DISPLAY SYSTEM WITH IMPROVED LUMINOSITY

FIELD OF THE INVENTION

This invention relaters general to display s),stems and, more specifically, to a rear projection display system that minimizes luminosity differences to the viewer.

BACKGROUND OF THE INVENTION

In viewing systems, and particularly in those viewing systems where multiple images are projected onto a screen the uneven emergence of light from the screen creates bright spots in the screen images seen by the viewer. Typically, Fresnel lens are used in projections systems for such purposes as magnifying the image or to limit the amount of incident light.

In the present invention, the Fresnel lens segments are angularly positioned so as to minimize luminosity difference on the screen. That is, be angularly positioning the light transmission segments within the Fresnel lens one can deflect the incoming light rays, which enter the Fresnel lens at different angles, so that all the light rays emerge from the Fresnel lens at the same angle. In the present invention the combined effect of the angular positioning of each of the viewing segments in the Fresnel lens and the internal refraction tofu the light by the Fresnel material can be controlled to bend the light rays passing through each segment so that the light rays exiting the Fresnel lens exit an angle which is parallel to each other.

BRIEF DESCRIPTION OF THE PRIOR ART

U.S. Pat. No. 4,482,206 shows a rear projection television screen that uses two Fresnel lens and maintains the angle of incident of light to less than 40 degrees to reduce the amount of reflected light.

U.S. Pat. No. 4,695,135 discloses an information display panel wherein a Fresnel lens is placed on the front surface of an array of television screens to create a large scale television screen.

U.S. Pat. No. 4,152,047 discloses a projection screen using a Fresnel lens where the optically inactive surfaces are approximately parallel with the incoming rays.

U.S. Pat. No. 4.076,384 discloses a rear projection system using a Fresnel lens to direct more light toward the viewers eye.

U.S. Pat. No. 5,313,326 discloses the use of a Fresnel mirror in an automobile.

U.S. Pat. No. 5,390,050 discloses forming in eccentric Fresnel lens from a concentric Fresnel lens.

U.S. Pat. No. 5,864,431 discloses a method of eliminating or reducing distortion using a Fresnel lens.

U.S. Pat. No. 3,628,854 discloses a flexible Fresnel lens that can be adhered to an ophthalmic lens.

U.S. Pat. No. 3,982,822 discloses a composite Fresnel lens assembly.

U.S. Pat. No. 4,293,196 discloses an objective lens system with an aspherical Fresnel lens.

SUMMARY OF THE INVENTION

Briefly, the present invention comprises a rear projection system having a display screen and a Fresnel lens wherein the each of the incident faces of the viewing segments of the Fresnel lens are angularly positioned so that incoming light rays, which enter each of the viewing segments at different angles, are reflected by each of the segments so that the light rays from each of the viewing segments emerge in a direction parallel to each other to thereby limit luminosity differences in images viewable on the display screen.

DESCRIPTION OF THE PREFERRED EMBODIMENT

Figure 1:
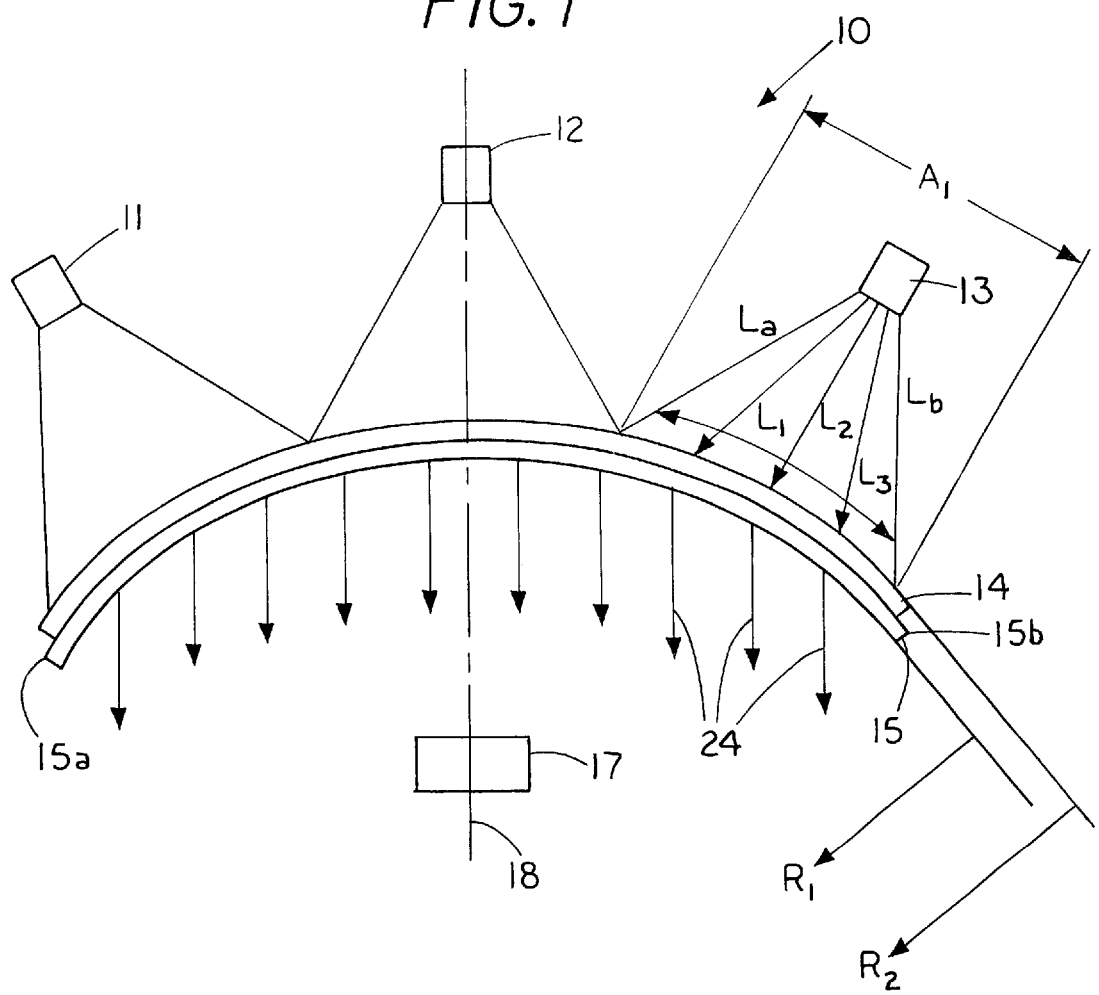
FIG. 1 shows a rear projection system of the present invention wherein the luminosity differences across the display screen are minimized.
Figure 1A:
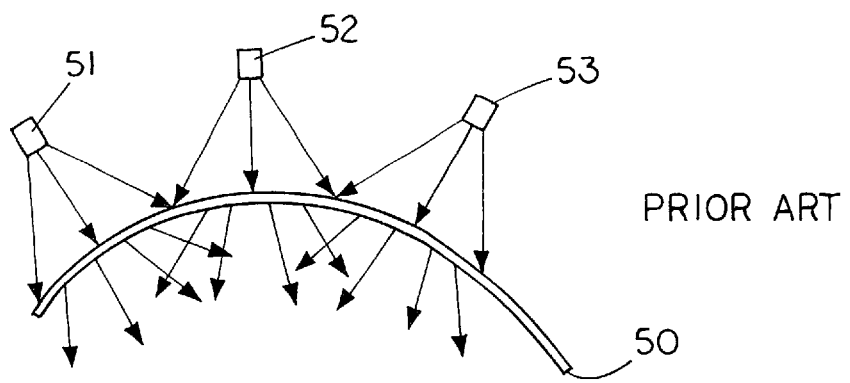
FIG. 1a shows a prior rear projection system.

FIG. 1a shows a prior art rear projection system having a rear projection screen 50 with projectors 51, 52 and 53 projecting images onto a rear projection screen 50. The light rays are indicated by arrows with the light rays diverging outward from each of the projectors 51, 52 and 53 before passing through the rear projection screen 50. The arrows indicted the light rays emerging from the projection screen 50 also diverge outward with the result that rear projection screen 50 contains bright spots or luminosity differences between different portions of the screen.

FIG. 1 shows a rear projection system or console 10 of the present invention wherein the luminosity differences across a rear projection display screen 15 are minimized or eliminated. In the embodiment shown a curved display screen 15 having a radius of curvature $R_1$ is positioned proximate to a Fresnel lens 14 having a radius of curvature $R_2$ with $R_1$ and $R_2$ being such that the Fresnel lens 14 and the display screen can be positioned next to each other in a layered manner. Typically, a rear projection display system is part of a console which permits an operator to view images on the curved display screen.

Located on the back side screen 15 are three rear screen projectors 11 12 and 13 that each project an image onto display screen 15. In the preferred use of the system separate images are projected and matched to each other so the viewer sees a single composite image. A viewing axis 18 extends perpendicular to display screen 15 with a viewers chair or operator station 17 positioned along viewing axis 18 and midway between a first end 15a of rear projection screen 15 and a second end 15b of rear projection screen 15. FIG. 1 shows a set of light rays 24 emerging from the viewing side of display screen 15. Each of the emerging light rays 24 are parallel or substantially parallel to each other and to viewing axis 18. By having the light rays 24 emerge parallel to the viewing axis 18 one minimizes luminosity differences across the display screen 15. Although the light rays emerging from the display screen 15 are parallel to the viewing axis 18 the light rays emanating from the rear projectors do not enter in a direction parallel to the viewing axis 18 nor do they enter in an angle parallel to each other. Note, rear projector 13 directs light rays over an extended area $A_1$ with the light ray $L_a$ defining one boundary of the light rays and light ray $L_b$ defining a second boundary of the light rays emanating from projector 13. It will be noted that even though the angle of the incoming light rays $L_a$ and $L_b$ vary across the extended area $A_1$ the angle of the light rays emerging from the display screen 15 remain parallel to the viewing axis. Intermediate light rays emanating from projector 13 all at different angles are identified by $L_1$, $L_2$ and $L_3$.

Figure 2:
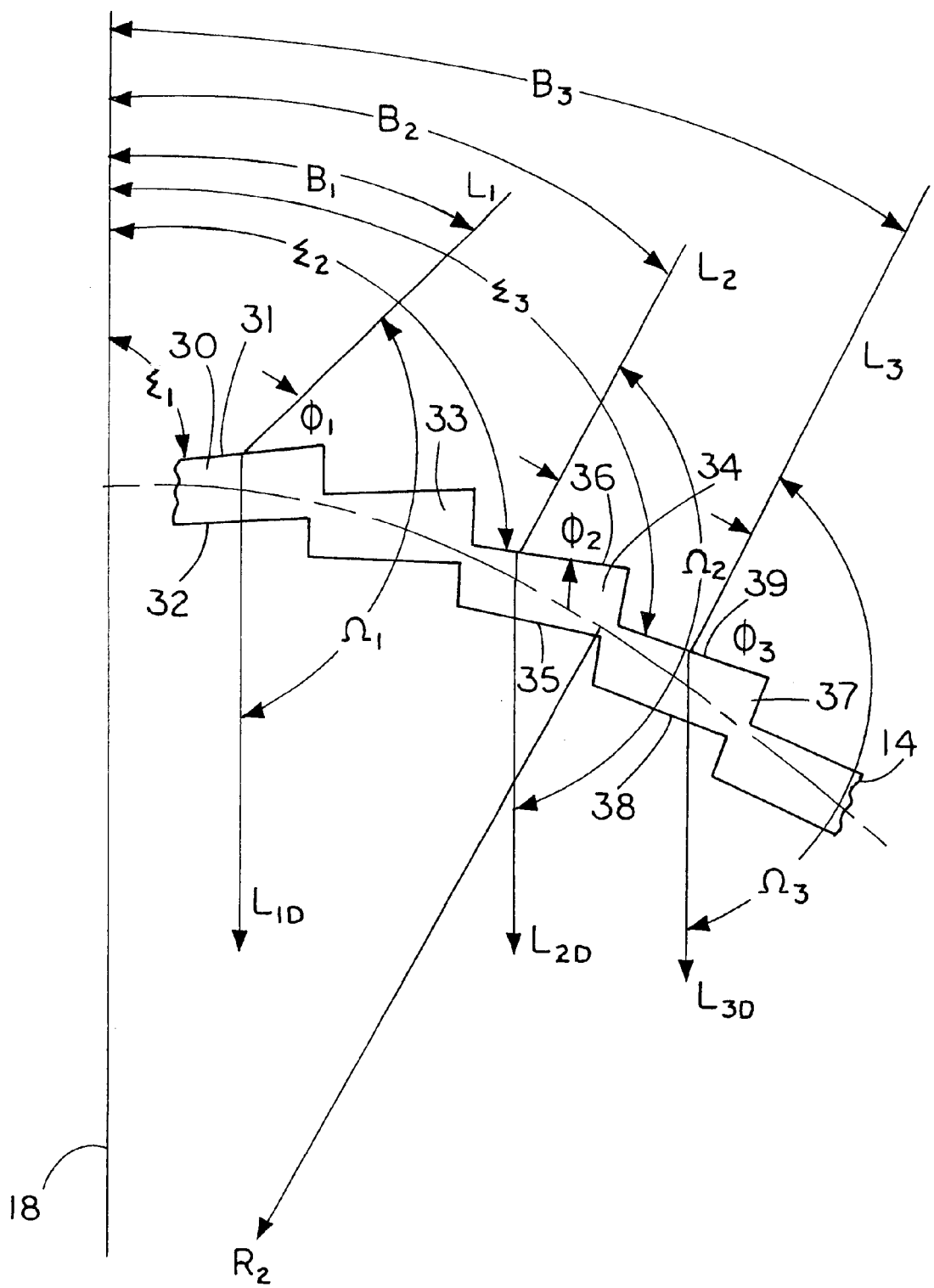
FIG. 2 shows an enlarged view of a portion of a Fresnel lens to reveal the bending of light to minimize luminosity differences to the viewer.

Referring to FIG. 2 a portion of a Fresnel lens 14 has been greatly enlarged to reveal how the incoming light rays $L_1$, $L_2$ and $L_3$, which enter the Fresnel lens 14 at different angles, can emerge from the Fresnel lens 14 at an angle that is parallel or substantially parallel to the viewing axis 18.

Fresnel lens 14, which is made from a substantial transparent material such as a polymer plastic or glass, is shown having a series of transparent viewing segments 30, 33, 34 and 37 that are located along a radius of curvature $R_2$. The viewing segments are preferably elongated sections that run from the top to the bottom of the projection screen 15. The viewing axis is identified by reference numeral 18. For case in understanding the invention only three segments with light rays passing, therethrough will be described. Each of the segments has an incident face and an exit face. That is, segment 30 has an incident face 31 and an exit face 32, segment 34 has an incident face 36 and an exit face 35 and segment 37 has an incident face 39 and an exit face 38. The angle of each of the incident faces with respect to the viewing axis is identified as angle $\Sigma$. That is, incident face 31 forms an angle $\Sigma_1$ with viewing axis 18 and similarly incident face 36 forms an angle $\Sigma_2$ with respect to viewing axis 18 and incident face 39 forms an angle 13 with respect to viewing axis 18.

Three light rays $L_1$, $L_2$ and $L_3$ have been identified for purposes of explaining the operation of the invention. Note, that light ray $L_1$ forms a first angle $\beta_1$ with viewing axis 18, light ray $L_1$ forms a second angle $\beta_2$ with viewing axis 18 and light ray $L_3$ forms a third angle $\beta_3$ with viewing axis 18 with each of the angles $\beta_1$, $\beta_2$ and $\beta_3$ different from one another.

Thus, the incoming light rays $L_1$, $L_2$ and $L_3$ enter the Fresnel lens 14 at different angles to the viewing axis 18; however, the light rays emerging from the Fresnel lens 14 are parallel to viewing axis 18. That is light ray $L_1$ enters at an angle $\beta_1$ and emerges as light ray $L_{ie}$ which is parallel to viewing axis 18. Thus, light ray $L_1$ is bent through an angle indicated by $\Omega_1$. Similarly, light ray $L_2$ enters at an angle $\beta_2$ and emerges as light ray $L_{2e}$, which is parallel to viewing axis 18. Thus, light ray $L_2$ has been bent through an angle indicated by $\Omega_2$. Similarly, light ray $L_3$ enters at an angle $\beta_2$ and emerges as light ray $L_{3e}$ which is parallel to viewing axis 11. Thus, light ray $L_3$ has been bent through an angle indicated be $\Omega_3$.

In order to maintain the emerging light rays parallel to each other and the viewing axis 18 the angle of the incident face $\Sigma$ of each of the segments is angularly positioned so that the angle of incident of the light ray $\phi$ coupled with the internal light refraction of the material causes the emerging light ray to emerge parallel to the viewing axis 18. As the internal reflection of the light ray remains constant for a given material one can direct the emerging light ray at the proper exit angle by positioning each of the incident faces so that the angular deflection of the light rays results in each of the light rays emerging parallel to the viewing axis 18.

FIG. 2 illustrates that light rays $L_1$, $L_2$ and $L_3$ while respectively located at different angles $\beta_3$, $\beta_3$ and $\beta_3$ with respect to the viewing axis 18 respectively emerge as light rays $L_1$, $L_{2e}$ and $L_{3e}$, which are parallel to viewing axis 18 by the angular positioning of incident faces 31, 36 and 39.

In the embodiment shown the Fresnel lens is comprised of vertical segments with the number of segments per inch selected to provide a continuous image. In addition, while the Fresnel lens can be used to magnify objects in the present embodiment it is preferred to maintain the magnification factor at 1×rather than enlarging the image.

Thus the present invention also includes the method of minimizing luminosity differences in a rear projection screen by (a) placing a Fresnel lens having a plurality of viewing segments in an condition for viewing images therethrough; (b) projecting an image with a plurality of light rays onto one side of the Fresnel lens; and (c) angularly positioning the viewing segments so that each of the viewing segments reflects an incoming light ray outward in a direction parallel to each other or a viewing axis.

What is claimed is:

1. A rear projection console to limit luminosity differences comprising:

a continuously curved rear projection screen, said rear projection screen having a first radius of curvature $R_1$;

a viewing axis;

a continuously curved Fresnel lens, said Fresnel lens having a second radius of curvature $R_2$ wherein $R_2$ is substantially equal to $R_1$ to enable said Fresnel lens to mounted proximate said rear projection screen, said Fresnel lens having a first segment, said first segment having an incident face and an exit face, said incident face of said first segment forming an angle $\Sigma_1$ with respect to said viewing axis so that when a first light ray at an angle $\beta_1$ to said viewing axis passes through said Fresnel lens the angle of the light ray deflection $\Omega_1$ with respect to the first light ray is such that the first light ray exiting said Fresnel lens first segment is parallel to said viewing axis, said Fresnel lens having a second segment, said second segment having an incident face and an exit face, said incident face of said second segment forming an angle $\Sigma_2$ with respect to said viewing axis so that when a second light ray at an angle $\beta_1$ with said angle $\beta_1$ different from said angle $\beta_1$ passes through said Fresnel lens second segment the angle of the second light ray deflection $\Omega_2$ is such that the second light ray exiting said Fresnel lens second segment is parallel to said viewing axis to thereby minimize luminosity differences in an image viewable on said rear projection screen.

2. The rear projection console of claim 1 wherein a viewers chair is located midway between a first end of said rear projection screen and a second end of said rear projection screen.

3. The rear projection console of claim 1 including at least three projectors.

4. The rear projection console of claim 1 wherein the magnification of the Fresnel lens is 1×.

5. The rear projection console of claim 1 wherein the Fresnel lens is a polymer.

6. A rear projection console to limit luminosity differences comprising:

a rear projection screen;

a viewing axis;

a continuously curved Fresnel lens, said Fresnel lens having a first segment, said first segment having an incident face and all exit face, said incident face of said first segment angularly positioned at an angle $\Sigma_1$ with respect to said viewing axis so that a first light ray emerges from said Fresnel lens first segment in a condition parallel to said viewing axis, said Fresnel lens having a second segment, said second segment having an incident face and an exit face, said incident face of said second segment angularly positioned at an angle $\Sigma_2$ with respect to said viewing axis so that a second light ray emerges from said Fresnel lens second segment in a condition parallel to said viewing axis to thereby minimize luminosity differences in an image viewable on said rear projection screen.

7. The rear projection console of claim 6 wherein the rear projection screen is curved.

8. The rear projection console of claim 6 wherein each of the segments have a flat incident face.

9. The rear projection console of claim 6 wherein each of the segments have a flat viewing face parallel to an exit face.

10. The method of minimizing luminosity differences in a rear projection screen comprising the steps of:

placing a continuously curved Fresnel lens having a plurality of viewing segments in a condition for viewing images therethrough;

projecting an image with a plurality of light rays onto a first side of the curved Fresnel lens;

angularly positioning the viewing segments so that each of the viewing segments reflects an incoming light ray outward in a direction parallel to each other and to a viewing axis extending through the curved Fresnel lens.

11. The method of claim 10 including projecting an image from at least three different projectors.

12. The method of claim 10 including placing a rear projection screen proximate the Fresnel lens.

13. The method of claim 10 including the step of forming the Fresnel lens of a polymer plastic.

14. The method of claim 10 including the step of curving the Fresnel lens.

15. The method of claim 10 including the step of placing parallel segments in the Fresnel lens.

* * * * *